United States Patent
Varatharajah et al.

(10) Patent No.: US 6,910,697 B2
(45) Date of Patent: Jun. 28, 2005

(54) SHOPPING CART THAT ENABLES SELF-CHECKOUT

(75) Inventors: Anandakumar Varatharajah, Wattala (LK); Eric A. Bunn, San Jose, CA (US)

(73) Assignee: Symbol Technologies, Inc., Holtsville, NY (US)

(*) Notice: Subject to any disclaimer, the term of this patent is extended or adjusted under 35 U.S.C. 154(b) by 566 days.

(21) Appl. No.: 09/738,491

(22) Filed: Dec. 15, 2000

(65) Prior Publication Data

US 2004/0073489 A1 Apr. 15, 2004

(51) Int. Cl.[7] ............................................. B62D 39/00
(52) U.S. Cl. .......................... 280/33.992; 280/33.991; 705/23; 705/16; 235/383
(58) Field of Search .............................. 705/23, 16, 17, 705/21, 22, 24; 235/383, 384; 280/33.992, 33.991, 33.995

(56) References Cited

U.S. PATENT DOCUMENTS

| | | | |
|---|---|---|---|
| 3,836,755 A | * 9/1974 | Ehrat | 235/383 |
| 3,994,505 A | * 11/1976 | Balha | 280/33.994 |
| 4,545,591 A | * 10/1985 | Balha | 280/33.994 |
| 4,590,470 A | 5/1986 | Koenig | |
| 4,623,964 A | 11/1986 | Getz et al. | |

(Continued)

FOREIGN PATENT DOCUMENTS

| | | |
|---|---|---|
| EP | 0 284 764 A3 | 10/1988 |
| EP | 0 793 186 A2 | 9/1997 |
| EP | 0 855 687 A2 | 7/1998 |
| EP | 0 902 381 A2 | 3/1999 |

(Continued)

OTHER PUBLICATIONS

Herda, S. "Non–repudiation: Constituting evidence and proof in digital cooperation," Computer Standards and Interfaces, 17:69–79(1995).

Allan et al., U.S. patent application Ser. No. 09/480,883, "An Electronic–Receipts Service".

(Continued)

*Primary Examiner*—James S. McClellan
(74) *Attorney, Agent, or Firm*—Fay Kaplun & Marcin, LLP

(57) ABSTRACT

Apparatus that assist a shopper during his visit to a merchant store. In one embodiment in the form of a shopping cart, the invention enables a shopper to check himself out of the merchant store. The shopping cart includes a bar-code scanner. The shopping cart rejects non-scanned goods and accepts or rejects scanned goods as directed by the shopper. In another embodiment, the shopping cart includes a web-enabled computer with display. The computer displays product-specific information. The shopping cart computer may detach from the cart—with or without its accessories. The shopper can use the same computer at home to browse the web, to prepare for the shopping trip, to do other transactions. The shopper puts goods in a input bin of the shopping cart. One or more scanners attached to the input bin scan the product for identity. The computer retrieves product-specific information and displays this information on its display. On the successful scanning of a product and a display of the product's information, the shopper can accept or reject the product. The product moves into one container in the cart if accepted and moves to a different container in the cart if rejected. On completing shopping, the shopper selects his preferred payment method on the device and pays using the selected method. At the packaging counter, a merchant agent sees a indication that the shopper has paid and, in response, unlocks the cart to remove and pack the goods. Accordingly, the merchant minimally assists in the checkout.

15 Claims, 11 Drawing Sheets

U.S. PATENT DOCUMENTS

| | | | |
|---|---|---|---|
| 4,928,279 A | | 5/1990 | Muroi |
| 5,144,115 A | | 9/1992 | Yoshida |
| 5,235,509 A | | 8/1993 | Mueller et al. |
| 5,406,271 A | * | 4/1995 | Sonnendorfer et al. ..... 340/5.91 |
| 5,493,315 A | | 2/1996 | Atchley |
| 5,557,088 A | * | 9/1996 | Shimizu et al. ............. 235/383 |
| 5,590,038 A | | 12/1996 | Pitroda |
| 5,696,909 A | | 12/1997 | Wallner |
| 5,732,400 A | | 3/1998 | Mandler et al. |
| 5,734,839 A | | 3/1998 | Enoki et al. |
| 5,739,512 A | | 4/1998 | Tognazzini |
| 5,836,051 A | | 11/1998 | Myers |
| 5,864,825 A | | 1/1999 | Kobayashi et al. |
| 5,883,810 A | | 3/1999 | Franklin et al. |
| 5,889,863 A | | 3/1999 | Weber |
| 5,899,980 A | | 5/1999 | Wilf et al. |
| 5,915,022 A | | 6/1999 | Robinson et al. |
| 6,049,787 A | | 4/2000 | Takahashi et al. |
| 6,435,407 B1 | * | 8/2002 | Fiordelisi ..................... 235/383 |
| 6,484,939 B1 | * | 11/2002 | Blaeuer ....................... 235/383 |

FOREIGN PATENT DOCUMENTS

| | | |
|---|---|---|
| EP | 0 969 430 A1 | 1/2000 |
| GB | 2 306 025 A | 4/1997 |
| GB | 2 213 276 A | 11/1997 |
| IT | WO 98/42239 * | 10/1998 |
| JP | 10 275191 | 10/1998 |
| WO | WO 97/49050 | 12/1997 |
| WO | WO 98/28699 A1 | 7/1998 |
| WO | WO 98/41957 | 10/1998 |
| WO | WO 99/28830 | 6/1999 |
| WO | WO 99/66438 A1 | 12/1999 |
| WO | WO 00/55729 | 10/2000 |
| WO | WO 00/67218 | 11/2000 |

OTHER PUBLICATIONS

Allan et al., U.S. patent application Ser. 09/586,738, "A Point–Of–Sale/Service (POS) Portal", filed Jun. 5, 2000, a divisional of U.S. patent application Serial No. 09/480,883.

Allan et al., U.S. patent application Ser. 09/588,589, "A Secure Internet Vault for Consumer Receipts, Legal Documents and Commerce", filed Jun. 5, 2000, a divisional of U.S. patent application Ser. No. 09/480,883.

Allan et al., U.S. patent application Ser. 09/588,036, "Displaying Color Advertisements on Point–Of–Sale/Service (POS) Platforms", filed Jun. 5, 2000, a divisional of U.S. patent application Ser. No. 09/480,883.

Steele, J., "Bottom Line", *San Francisco Daily Journal*, Jan. 12, 2000, p. 2.

* cited by examiner

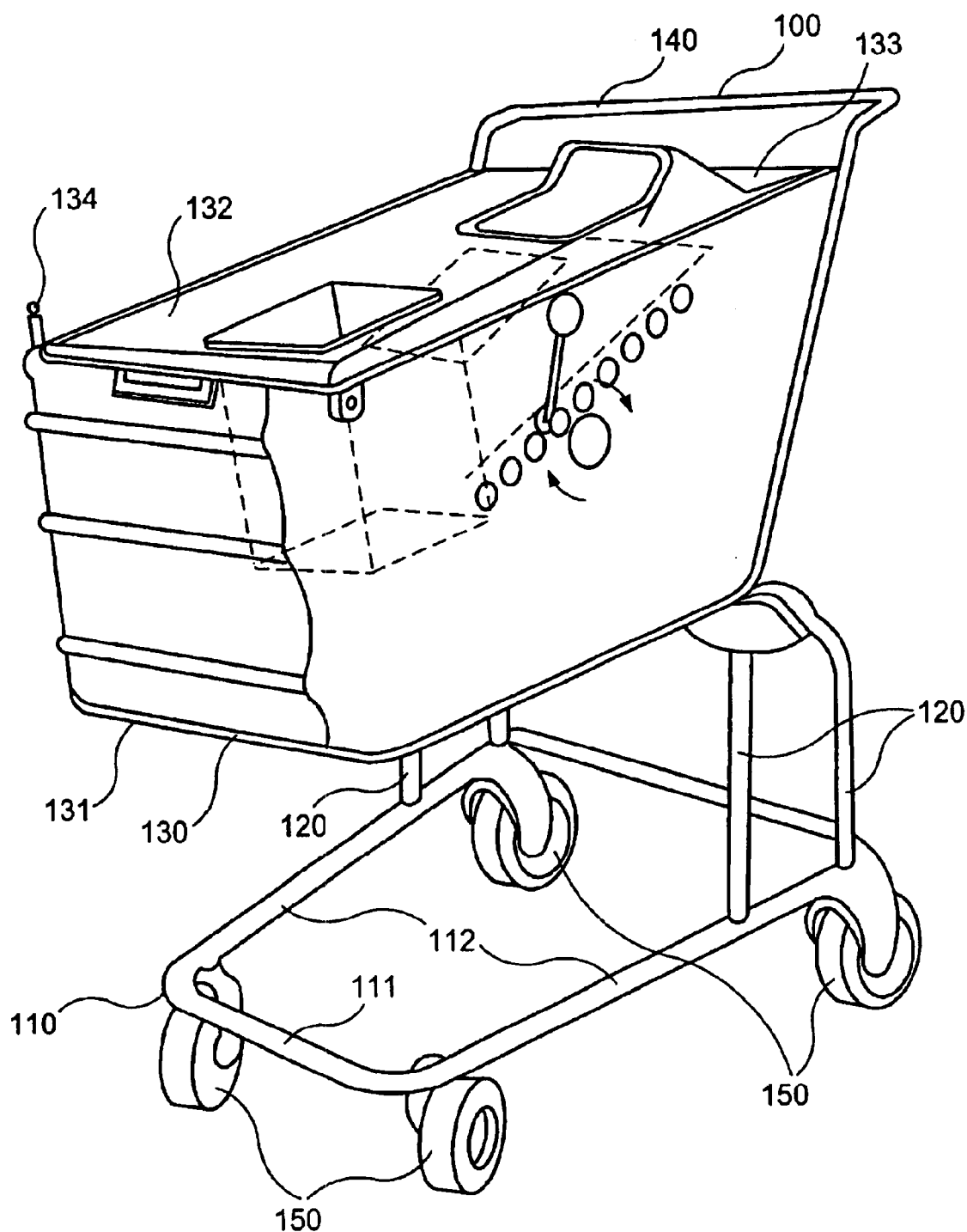
F I G. 1A

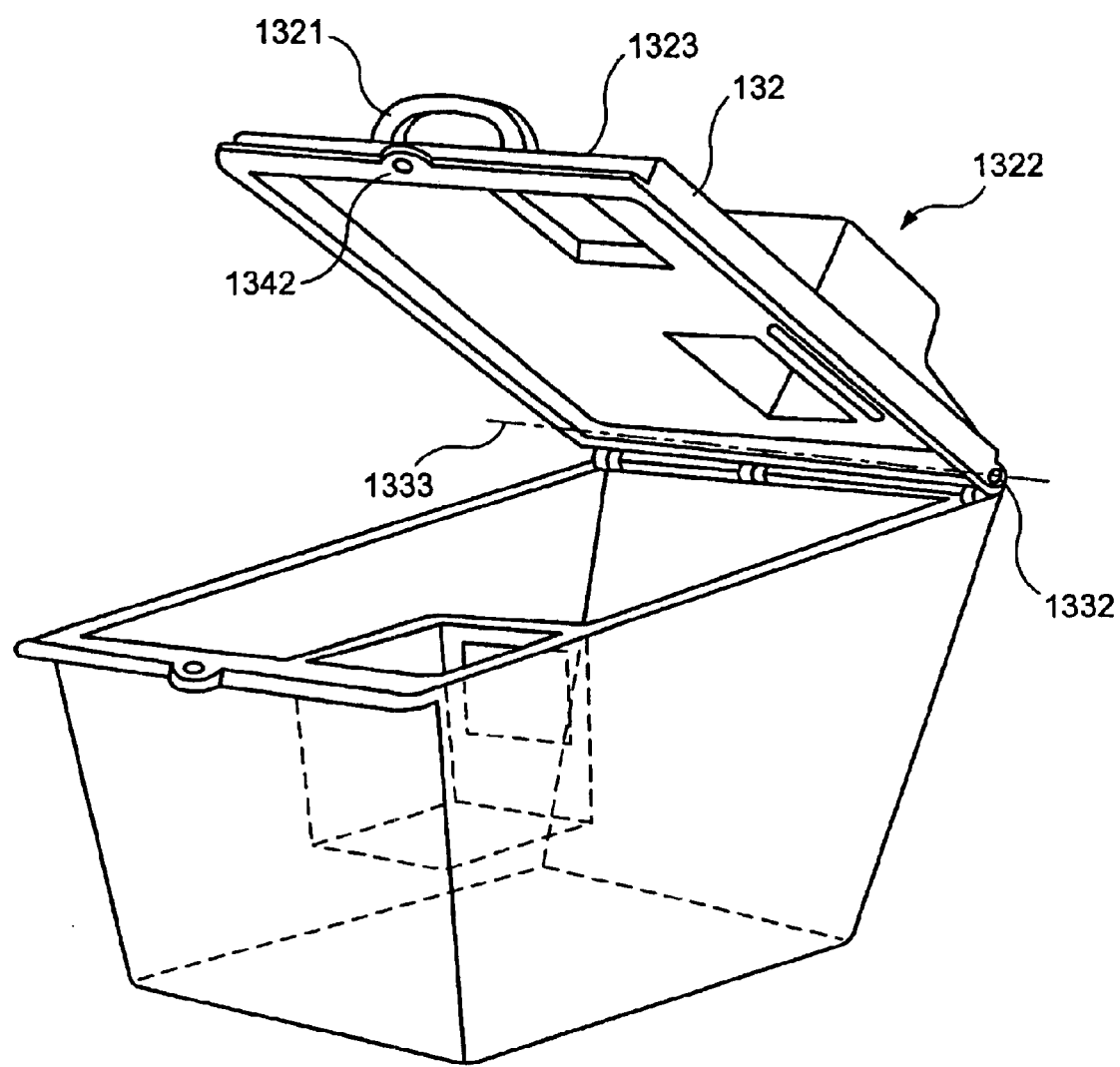
F I G. 3

SHOPPING CART THAT ENABLES SELF-CHECKOUT

BACKGROUND

This invention relates to shopping carts and computers. More particularly, this invention relates to shopping carts enhanced with computers and other decision mechanisms.

The art of shopping carts is readily discernable at the local supermarket. A prior-art shopping cart is a metal cage supported above a base on wheels. A fold-out section in the cart accommodates small or delicate purchases. In combination with cutouts from the metal cage, the fold-out section can accommodate small and delicate children.

Shopping carts are mechanical, passive devices, assisting the movement of goods from their shelves to the checkout station. Even where a LCD display and supporting video hardware have been added in order to display advertisements to the shopper, a shopping cart is still a passive device. Indeed, the merchant runs the risk of alienating his customers by merely adding display hardware to his shopping carts and bombarding his shoppers without providing any benefit to the shoppers.

Accordingly, it is desirable to make the shopping cart an active device during the shopping experience.

It is also desirable to have a shopping cart that assists the shopper in his shopping experience.

These and other goals of the invention will be readily apparent to one of skill in the art on reading the background above and the description below.

SUMMARY

Herein are described apparatus that assist a shopper during his visit to a merchant store. In one embodiment in the form of a shopping cart, the invention enables a shopper to check himself out of the merchant store. The shopping cart includes a bar-code scanner. The shopping cart rejects non-scanned goods and accepts or rejects scanned goods as directed by the shopper.

Alternate embodiments follow: the shopping cart may include a web-enabled, tamper-proof computer with a touch-sensitive display. The computer may display product-specific information such as the identity of an item selected for purchase, its price, nutritional contents, ingredients, expiration date, product reviews, etc.

The computer may also display advertisements, promotional materials and surveys. The cart may store the material locally on the computer or retrieve it from a remote source through a network. The displayed information may be targeted, based on the consumer identity, goods currently selected, purchase history, etc.

The computer may be capable of electronic-signature capture. The computer may be voice activated.

The device may have accessories coupled to it: an magnetic-strip reader, a smart-card reader or speakers, for example. Audio output is particularly useful to a visually impaired shopper.

The device also may have wireless-network and secure-encryption capabilities, enabling secure payments, internet and other transactions. The shopping cart may return gathered information to a central location such as a merchant data center or a merchant data farm. The cart may store the information locally for later retrieval.

The shopping-cart computer may detach from the cart—with or without its accessories. The shopper may be able to use the same computer outside the merchant to browse the web, to prepare for the shopping trip, to do secure transactions using their credit, debit, smart or merchant-specific cards.

The shopper may put goods in a input bin of the shopping cart. One or more scanners attached to the input bin may scan the product for identity (typically, a UPC or SKU bar code). The computer may retrieve product-specific information through a wireless network connection and display this information on its display.

On the successful scanning of a product and a display of its information, the shopper may accept or reject the product. The product may move into one container in the cart if accepted and moves to a different container in the cart if rejected.

On completing shopping, the shopper may select his preferred payment method on the device (cash, credit, debit, smart or merchant-specific card) and pays using the selected method.

At the packaging counter, a merchant agent may see an indication that the shopper has paid, and in response, the agent may unlock the cart to remove and pack the goods. Accordingly, the merchant minimally assists in the checkout.

The computer may assist in the back ordering, return or deferred payment for goods.

In a multi-store environment such as a mall, a shopper may select products from two or more of these stores and put them in the cart's input bin, accept the products and then pay only once for all of the products from the different stores when all his shopping is done.

In an alternate embodiment, a shopper may upload shopping lists from their personal digital assistants (PDAs), hand-held personal computers (HPCs), etc. to the cart computer.

BRIEF DESCRIPTION OF THE DRAWINGS

FIGS. 1A and 1B illustrate a shopping cart incorporating one embodiment of the invention. FIG. 1A offers a front-left view of a cart, while FIG. 1B offers a rear-right view of the same cart.

FIG. 3 illustrates the lid of the shopping cart basket of FIGS. 1A and 1B, according to one embodiment of the invention.

DESCRIPTION OF SPECIFIC EMBODIMENTS

Devices

Figure 1B:
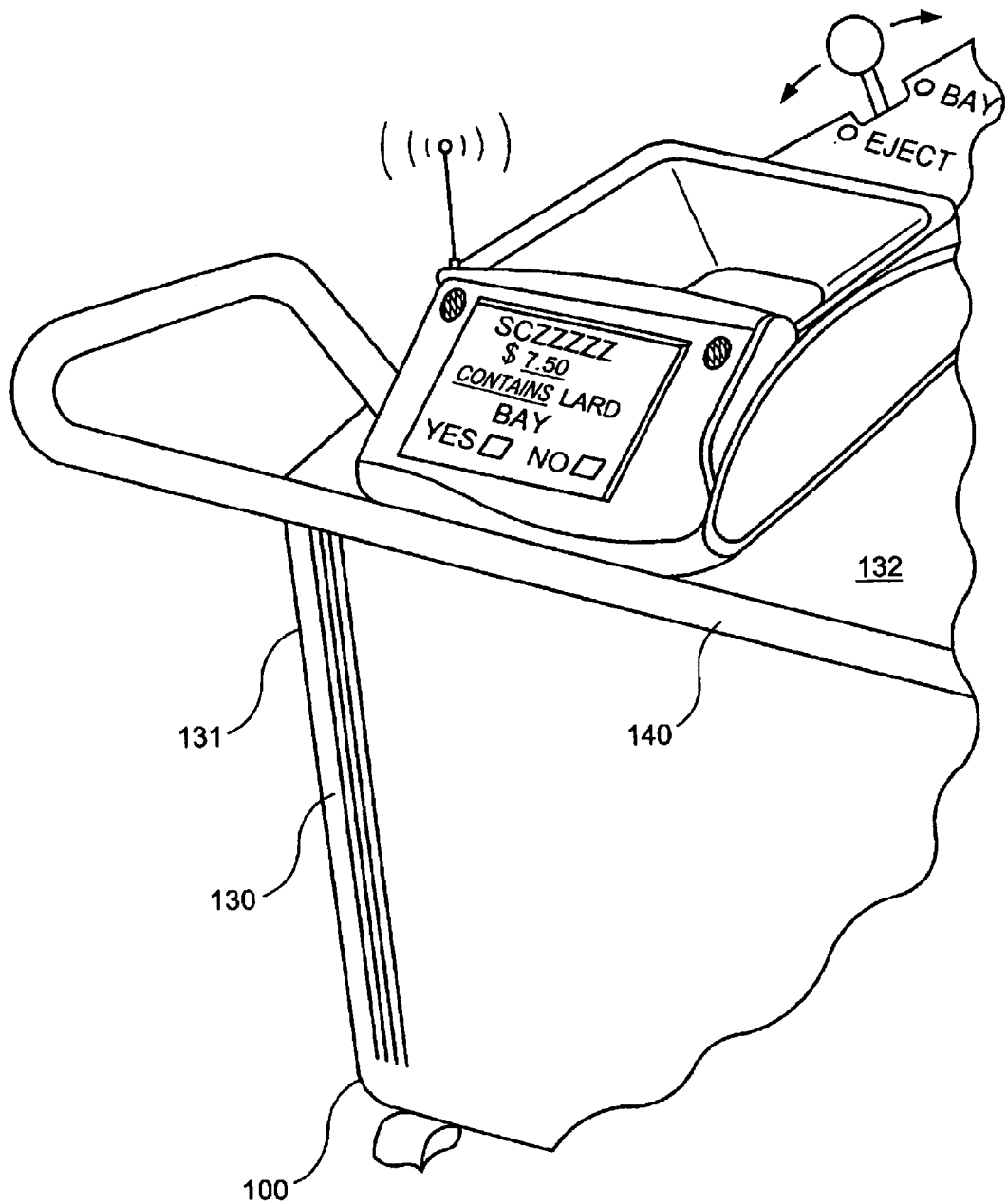

FIGS. 1A and 1B illustrate a shopping cart 100 incorporating one embodiment of the invention. FIG. 1A offers a front-left view of the cart 100, while FIG. 1B offers a rear-right view of the same cart 100.

The cart 100 may have a traditional shopping-cart form as follows: The cart 100 may include a U-shaped base frame 110, supports 120, a basket 130, a handle 140 and wheels 150. The supports 120 may rigidly couple the base frame 110 and the basket 130, supporting the basket 130 over the base frame 110. The supports 120 may attach to the base frame 110 and the basket 130 typically between the middle of the basket 130 and its rear-most portion. The wheels 150 may attach to the bottom of base frame 110, supporting the base frame 110 off the ground. The U-shaped, tubular handle 140 may span and attach to the uppermost rear of the basket 130 at the ends of the "U."

Forming a plane parallel to the ground, the base frame 110 may include a front member 111 and two rigidly, angularly attached side members 112. The wheels 150 may attach to the base frame 110 typically slightly rearward of the junctions of the front member 111 and the side members 112, as well as at the rearmost end of the side members 112.

The basket 130 differs from the prior-art lattice of metal bars. The basket 130 may be of any construct that accepts goods, securely holds its contents and prevents their removal except through a subsequent intentional relaxation of the security of the basket 130.

The basket 130 may include a bucket 131, a lid 132, a hinge 133 and a lock 134. The lid 132 sits above and on the bucket 131. The hinge 133 may mechanically couple the bucket 131 and lid 132 at the upper-rearmost of the bucket 131 and the rearmost of the lid 132. The lock 134 also may mechanically couple the bucket 131 and the lid 132—but at the upper-frontmost of the bucket 131 and the frontmost of the lid 132.

The hinge 133 may mechanically couple the bucket 131 and lid 132, permitting one to move with respect to the other while still maintaining their mechanical coupling. When engaged, the lock 134 defeats the operation of the hinge 133. The lock 134 maintains the lid 132 in its position above and on the bucket 131.

Figure 2:
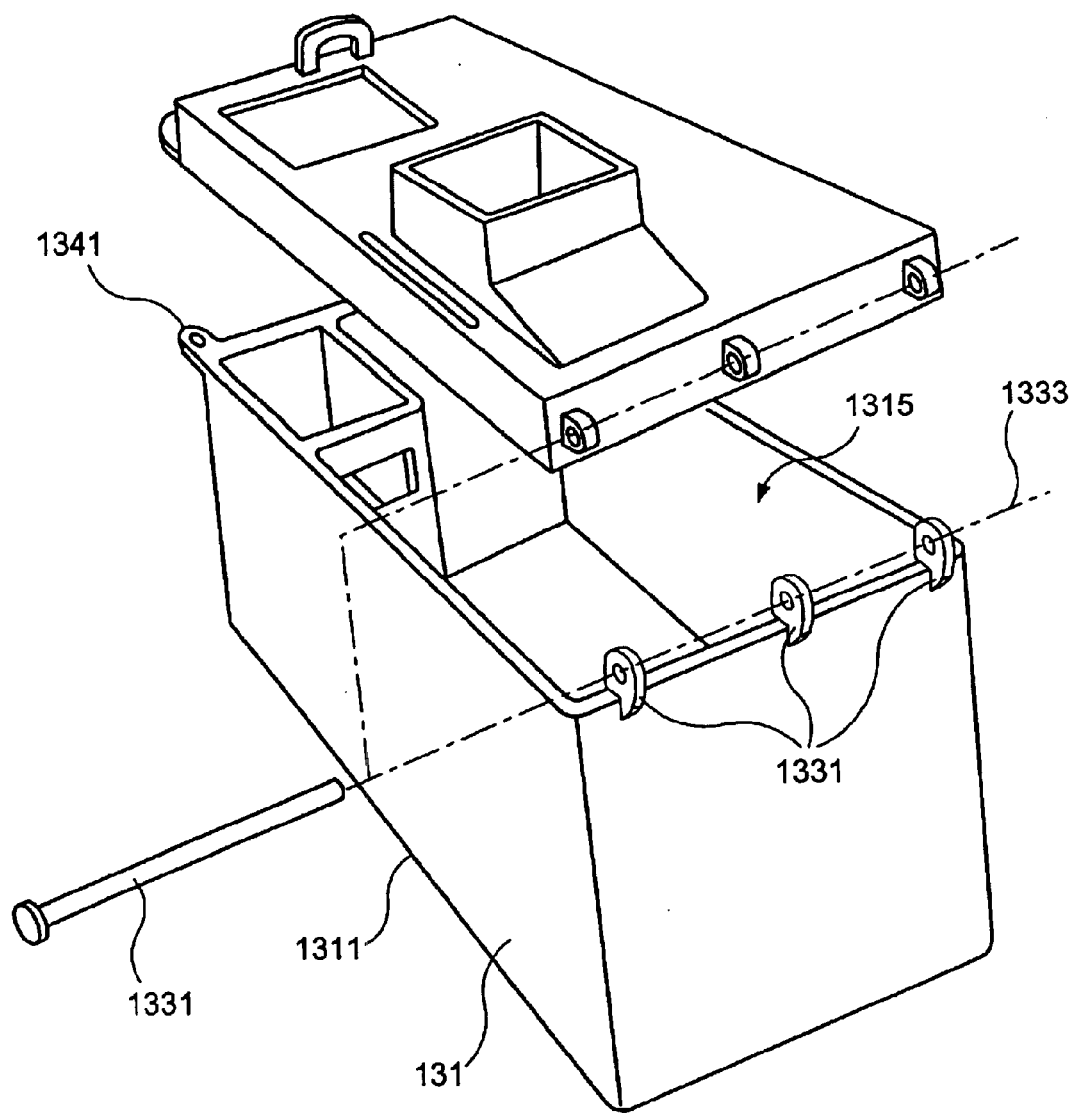
FIG. 2 illustrates the bucket of the shopping cart basket of FIGS. 1A and 1B, according to one embodiment of the invention.

FIG. 2 illustrates the bucket 131 according to one embodiment of the invention. The bucket 131 may include a bin 1311, an opening 1315, a hinge assembly 1331 and a lock assembly 1341. The bucket bin 1311 may be made of molded plastic and may have an overall shape similar to that of the prior-art metal-cage baskets. The bin 1311 and the hinge assembly 1331 may mechanically rigidly couple at the upper-rearmost of the bin 1311. The bin 1311 and the lock assembly 1341 may mechanically, rigidly couple at the upper-frontmost of the bin 1311.

FIG. 3 illustrates the lid 132 according to one embodiment of the invention. The lid 132 may include a cover 1323, an acceptance system 1322, a handle 1321, a hinge assembly 1332 and a locking assembly 1342. The cover may be essentially a plane of material. The cover 1323 and the hinge assembly 1332 may mechanically, rigidly couple at the rear of the cover 1323. The cover 1323 and the lock assembly 1342 may mechanically, rigidly couple at the front of the cover 1323.

The acceptance system 1322 may attach to the cover 132. Indeed, the acceptance system 1322 may pass through the plane of the cover 1323. The bulk of the acceptance system 1322 may reside within the bin 1311 as described further herein.

The hinge assembly 1332 of the lid 132 and the hinge assembly 1331 of the bucket 131 have a common axis 1333. The hinge assemblies 1331, 1332 couple to form the hinge 133 having an axis 1333. The hinge 133 permits the lid 132 to swing (above, rearward and) away from the bucket 131, exposing the inside of the bucket 131 and permitting the removal of items from inside the bucket 131.

The lock assembly 1341 of the bucket 131 and the complementary lock assembly 1342 of the lid 132 couple to form the lock 134. The lock 134 prevents the lid 132 from moving away from the bucket 131, thereby preventing the exposure of the inside of the bucket 131 and preventing the removal of items from inside the bucket 131.

The lid 132 may sit above and on the bucket 131, covering the bucket opening 1315. The shape of the lid 132 preferably matches the shape of the bucket opening 1315.

Figure 4A:
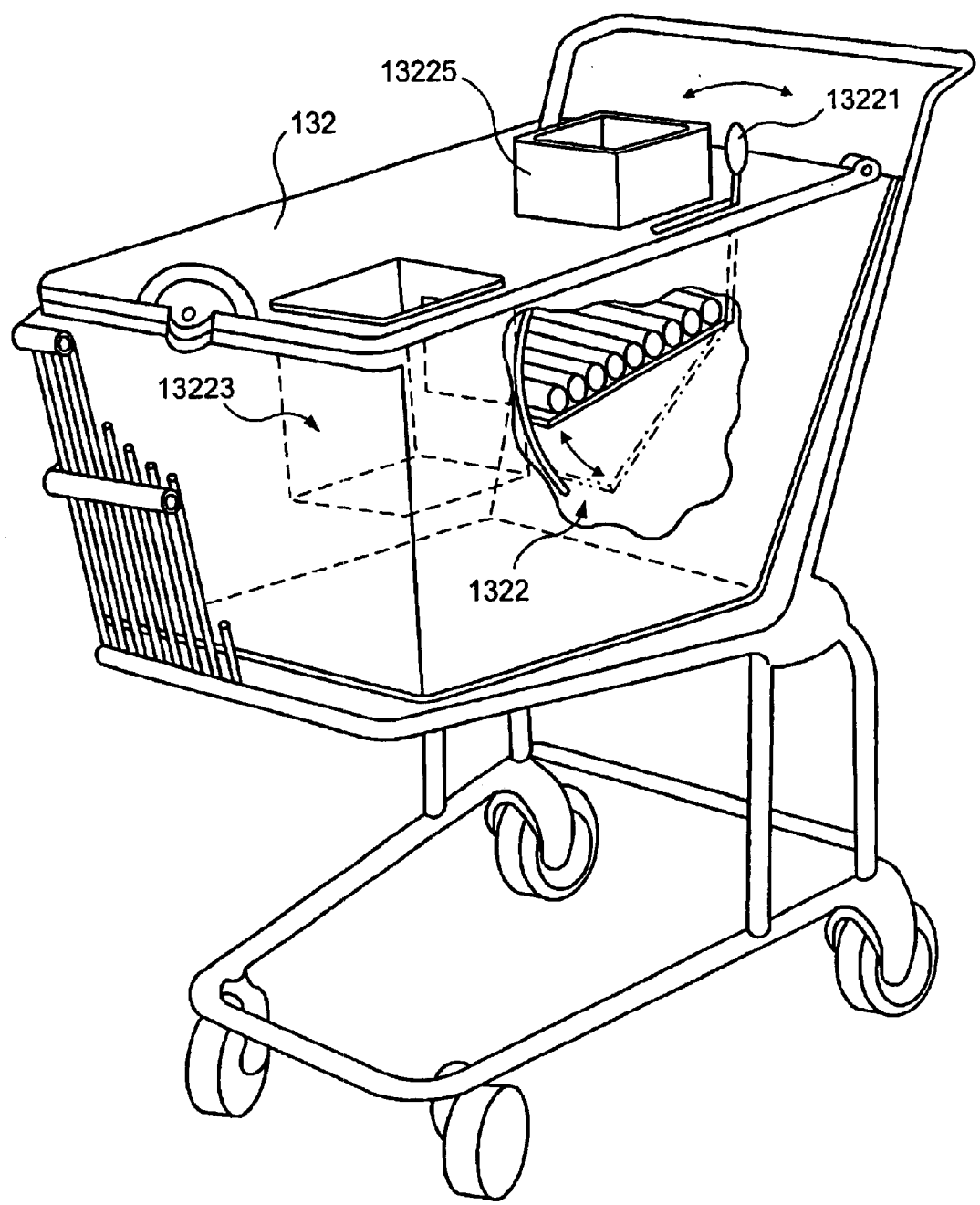
FIGS. 4A and 4B illustrate an acceptance system of the shopping-cart basket lid of FIG. 3, according to one embodiment of the invention.
Figure 4B:
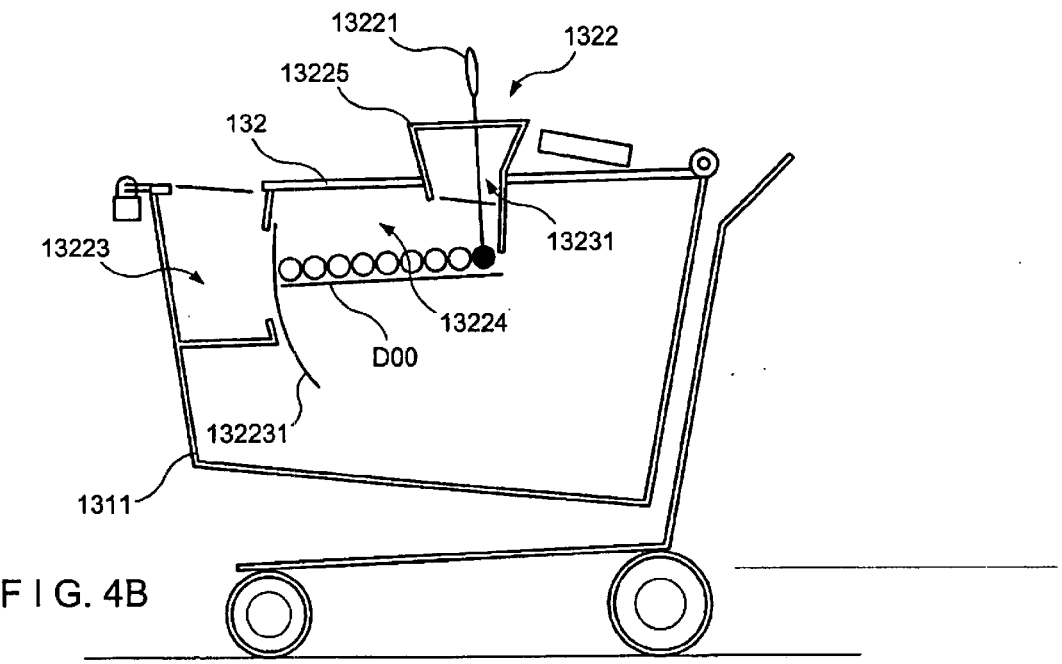

FIGS. 4A and 4B illustrate the acceptance system 1322 of the shopping-cart basket lid 132, according to one embodiment of the invention. The acceptance system 1322 may include an input bin 13225, a chamber 13224, a switch (three-position handle) 13221 and a no-sale bin 13223. The input bin 13225 may adjoin the chamber 13224 on a first side of the chamber 13224. The no-sale bin 13223 may adjoin the chamber 13224 on a second side of the chamber 13224. The chamber 13224 may enclose the space from the output of the input bin 13225 up to the input of the no-sale bin 13223. In this way, the chamber 13224 may prevent goods placed in the input bin 13225 from falling into the bucket bin 1311 or the no-sale bin 13223.

The three-position handle 13221 may attach to the chamber 13224 to achieve the effect described herein. The three positions of the handle 13221 may nominally be ACCEPT, REJECT and NEUTRAL. In its ACCEPT position, the handle 13221 may permit goods in the chamber 13224 to move into the bucket bin 1311 and prevent their movement into the no-sale bin 13223. In its REJECT position, the handle 13221 may permit goods in the chamber 13224 to move into the no-sale bin 13223 and prevent their movement into bucket bin 1311. In its NEUTRAL position, the handle 13221 may retain goods in the chamber 13224, preventing them from moving into the bucket bin 1311 or the no-sale bin 13223.

The handle 13221 may be spring loaded to return to the NEUTRAL position after its movement into the ACCEPT or REJECT position. One or more membrane switches on the shopping computer C00 (and the supporting hardware) are an alternate embodiment of the handle 13221. A keypad or touch screen is yet another alternative embodiment.

The cover 1323 of the lid 132 may include an opening 13231.

Figure 5:
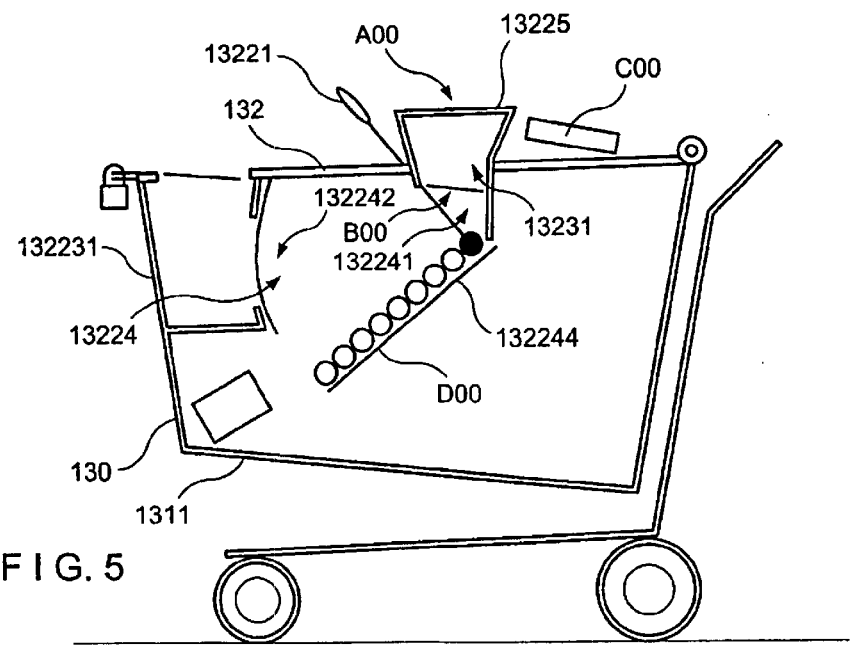
FIG. 5 illustrates the input bin of the acceptance system of FIG. 4, according to one embodiment of the invention.

FIG. 5 illustrates the input bin 13252 of the acceptance system 1322, according to one embodiment. The input bin 13225 may include two openings A00, B00 and a shopping computer C00. The first opening A00 may be accessible to the shopper, and the second opening B00 inaccessible to the shopper, especially when the basket 130 is locked closed. The input bin 13225 may intersect the plane of the lid 132—particularly so that the first input-bin opening A00 coincides with the lid cover opening 13231. This alignment allows goods to pass from outside of the basket 130 through the lid 132 into the interior of the basket 130. Accordingly, the first input-bin opening A00 may be located on the portion of the input bin 13225 external to the basket 130 while the second opening B00 may be located on the portion of the input bin 13225 inside the bucket 131.

The shopping computer C00 may be located with access to the space in the input bin 13225 between the first and second input-bin openings A00, B00. The shopping computer may also be accessible to the shopper.

The chamber 13224 may include two openings 132241, 132242, walls 132243 (not visible for being parallel to the plane of the drawing) and a conveyor 132244. The shape of the chamber 13224 may approximate a rectangular prism (a three-dimensional rectangle). The walls 132243 may mechanically couple to form the top and (two) sides of the chamber 13224. The conveyor 132244 couples to the side walls 132243 and forms the bottom of the chamber 13224. The chamber may have no front or back. These may be absent to create the openings 132241, 132242. The chamber 13224 may be located wholly within the bin 1311.

The conveyor 132244 may form the floor of the chamber 13224, thus separating the interior of the chamber 13224 from the interior of the bucket bin 1311. The conveyor 132244 may be substantially horizontal, although it may have a downward slope beginning-to-end in order to use gravity to assist the movement of goods from the first chamber opening 132241 to the second 132242.

The input bin 13225 adjoins the chamber 13224 such that the second input-bin opening B00 coincides with the first chamber opening 132241.

Figure 6:
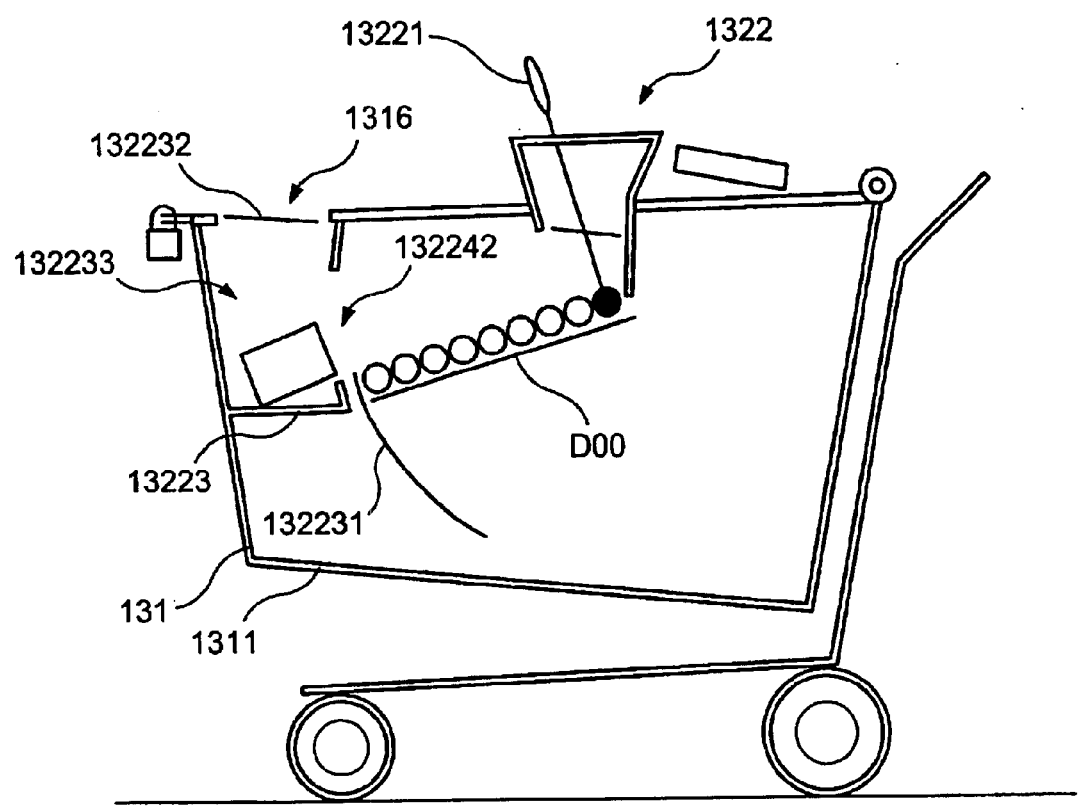
FIG. 6 illustrates the no-sale bin of the acceptance system of FIG. 4, according to one embodiment of the invention.

FIG. 6 illustrates the no-sale bin 13223 of the acceptance system 1322, according to one embodiment of the invention. The no-sale bin 13223 is an enclosure 132233 within the interior of the bucket 131 and has a door 132231. The no-sale bin door 132231 coincides with the second chamber opening 132242. (Of course, in an alternate embodiment, an opening may replace the no-sale bin door 132231, and a corresponding door may replace the second chamber opening 132242.

The no-sale bin 13223 may include a second door (or opening) 132232 preferably located on a portion of the no-sale bin closest to the sides of the bucket 131). The bucket 131 may include a corresponding second opening (or door) 1316 that accommodates this second door 132232. The no-sale bin 13223 is preferably large enough to hold multiple goods simultaneously.

Thus, a consumer may remove a rejected item from the no-sale bin 13223 by opening the second door 132232 and removing the rejected item. The item can then be returned to the shelf, into the freezer, etc., whence it came and soon after its removal. This immediate-replacement ability helps to reduce spoilage and makes a smaller no-sale bin 13223 feasible.

The conveyor 132244 may move goods placed in the input bin 13225 into either the bucket bin 1311 or the no-sale bin 13223. The conveyor 132244 may include a movable section D00. This movable section D00 may move between two positions. In its first position, the movable section D00 may maintain the integrity of the chamber 13224: Goods on the conveyor 132244 do not enter the bucket bin 1311. In its second position, the movable section D00 may defeat the integrity of the chamber 13224: The conveyor no longer separates the interior of the chamber 13224 from the interior of the bucket bin 1311, and goods on the conveyor 13222 fall into or otherwise enter the bucket bin 1311.

The input bin 13225, chamber 13224 and no-sale bin 13223 may form a first path for goods, as described herein. Thus, the first path for goods may begin at the opening A00 of the input bin 13225, pass through that input bin 13225, pass out the second opening B00 of the input bin 13225 and into the first opening 132241 of the chamber 13224. The path may then pass through the chamber 13224, out the second opening 132242 of the chamber 13224 and past the door 132231 of the no-sale bin 13223. The first path for goods may end in the no-sale bin enclosure 132233 or may continue through the no-sale bin enclosure 132233, out the re-sale bin second door 132232 and out the bucket second opening 1316.

A second path for goods deviates from the first path. Instead of passing through the chamber 13224 and out its second opening 132242, goods may pass the movable section D00 into the bucket bin 1311.

The three positions of the acceptance-system handle 13221 may nominally be ACCEPT, REJECT and NEUTRAL. In its ACCEPT position, the acceptance-system handle 13221 may permit goods on the chamber conveyor 132244 to move into the bucket bin 1311. In its REJECT position, the acceptance-system handle 13221 may permit goods on the chamber conveyor 132244 to move into the no-sale bin 13223. In its NEUTRAL position, the acceptance-system handle 13221 may prevent goods on the chamber conveyor 132244 from moving into the bucket bin 1311 or the no-sale bin 13223. The handle 13221 may be spring loaded or otherwise mechanically or electronically enabled to return to the NEUTRAL position after its movement into the ACCEPT or REJECT position.

As one embodiment, the acceptance-system handle 13221 moves the conveyor movable section D00 between its different positions. The acceptance-system handle also moves the no-sale bin door 132231 between its open and closed positions. More particularly, with the acceptance-system handle 13221 in its NEUTRAL position, the chamber conveyor 132244 is in its first (integral) position, and the no-sale bin door 132231 is closed. With the handle 13221 in its ACCEPT position, the chamber conveyor 132244 is in its second (non-integral) position, and the no-sale bin door 132231 is still closed. With the acceptance-system handle 13221 in its REJECT position, the chamber conveyor 132244 is in a third, intermediate position, and the no-sale bin door 132231 is open.

A motorized system that the user activates (perhaps from the shopping computer C00) may replace the mechanical acceptance-system handle 13221.

The position of the acceptance-system handle 13221 may determine the position of the conveyor movable section D00. A first, integrity position of the conveyor movable section D00 may correspond to the NEUTRAL position of the acceptance-system handle 13221, and a second, integrity-defeating position of the conveyor movable section D00 may correspond to the ACCEPT position of the acceptance-system handle 13221. A third, intermediate position may correspond to the REJECT position of the handle 13221.

Likewise, the position of the acceptance-system handle 13221 may determine the position of the no-sale bin door 132231. The no-sale bin door 132231 may be closed when the acceptance-system handle 13221 is in its NEUTRAL or ACCEPT position. The no-sale bin door 132231 may be open when the acceptance-system handle 13221 is in its REJECT position.

Figure 7:
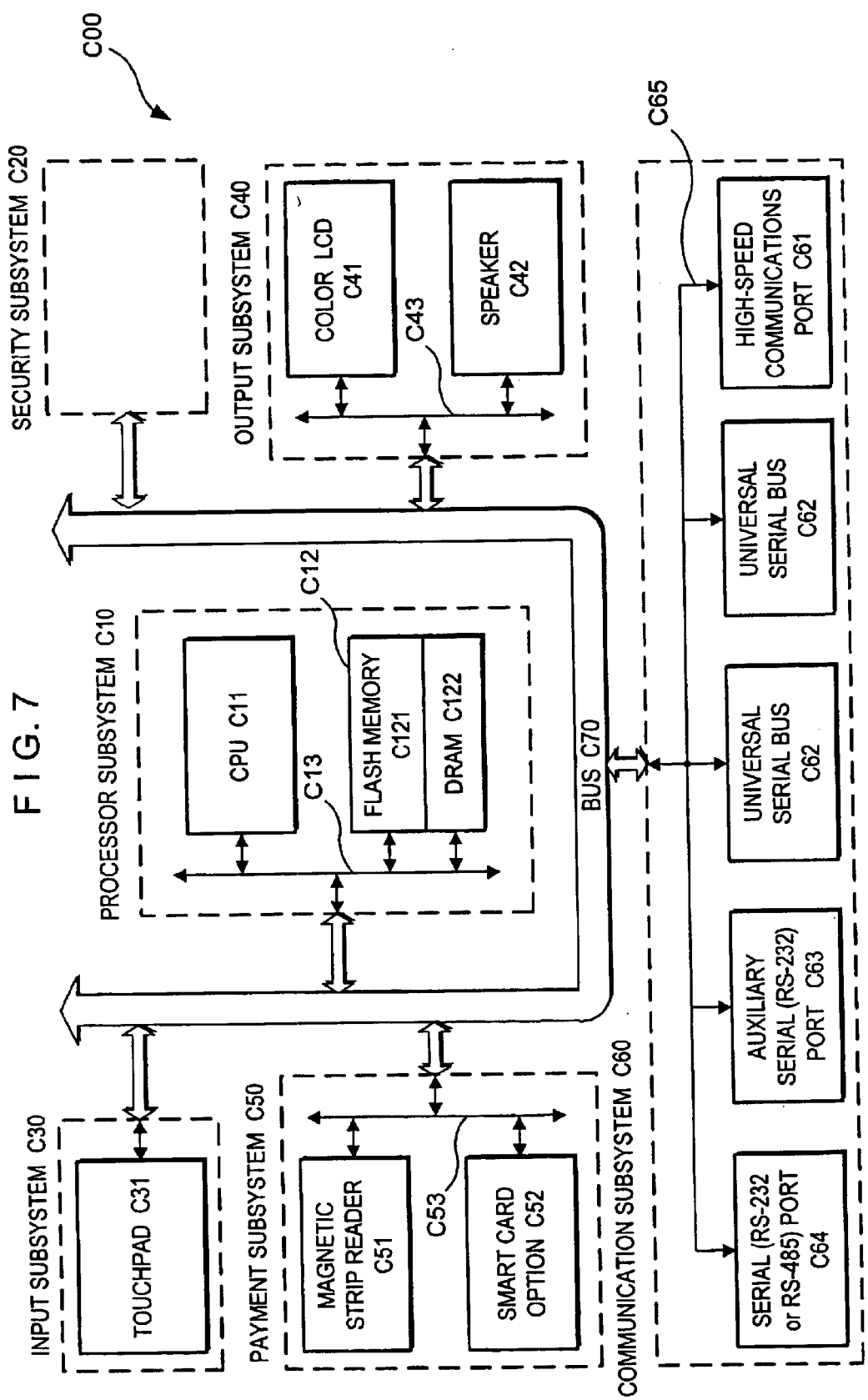
FIG. 7 illustrates the shopping computer of the acceptance system of FIG. 4, according to one embodiment of the invention.

FIG. 7 schematically illustrates the shopping computer C00, according to one embodiment of the invention. The shopping computer C00 may include a processor subsystem C10, a security subsystem C20, an input subsystem C30, an output subsystem C40, a payment subsystem C50, a communications subsystem C60 and a bus C70. The bus C70 may communicatively couple all of the security, input, output, payment and communications subsystems C20, C30, C40, C50, C60 to each other and to the processor subsystem C10.

The processor subsystem C10 may include a CPU C11, a memory C12 and a bus C13. The memory C12 may include one or more of the following: random-access memory (RAM) C122, as well as non-volatile memory C121 such as read-only memory (ROM), flash memory or magnetic disks. The bus C13 may communicatively couple the CPU C11 and the memory C12 and may be wholly or partly integral with the bus C70.

Further, the memory C12 contains software C123 (not shown). The software C123 may be layered: application software C1231 communicating with an operating system C1232, and the operating system C1232 communicating with an I/O subsystem C1233. The I/O subsystem C1233 may communicate with the processor, security, input, output, payment and communications subsystems C10, B20, C30, C40, C50, C60. The memory C12 may be programmed according to the methods described herein.

The input subsystem C30 may include a keypad (not shown), a touch pad C31, a scanner C32, a keyboard (not shown), a voice-recognition system (not shown) or any other device for entering data into a computer, as well as a bus C33. The bus C33 may communicatively couple the components of the input subsystem C30 to the bus C70 and may be wholly or partly integral with the bus C70.

The scanner C32 identifies products by scanning a code on the product or otherwise sensing an identifier on the product. Typically, the code is an encoded Universal Product Code (UPC) or stock keeping unit (SKU) number. The scanner C32 may be multiple scanners in fact. As is well known in the art, multiple scanners may be placed to permit multiple scans of the item. The multiple scans increase the probability that the sought identifier will be found—despite the goods' orientation.

The communications subsystem C60 may include a serial port C64, an auxiliary port C63, a parallel port C62, a high-speed communications port C61, a wireless communications port C66 or any other port for communicating with a computer, as well as a bus C65. The bus C65 may communicatively couple the ports C66, C64, C63, C62, C61 to the bus C70. The bus C65 may be wholly or partly integral with the bus C70.

The output subsystem C40 may include a display C41 (preferably a color liquid crystal display (LCD)), a sound system C42 (preferably a speaker) or any other device for transferring data out of a computer, as well as a bus C43. The bus C43 may communicatively couple the display C41 and the sound system C42 to the bus C70 and may be wholly or partly integral with the bus C70.

The payment subsystem C50 may include a magnetic-strip reader C51, a smart-card processor C52, a currency validator, collector and changer or any other device for receiving payment, as well as a bus C53. The bus C53 may communicatively couple the magnetic-strip reader C51, the smart-card processor C52 and the bus C70. The bus C53 may be wholly or partly integral with the bus C70. (The payment system C50 may also handle the other types of payment mentioned herein.)

The touch pad C31 may lie above and upon the display C41, although it need not be co-extensive with the display C41. Where, for example, the display C41 is full VGA or XGA and the touch pad 230, C31 is only one-quarter so, that portion of the display C41 over the touch pad 230, C31 may be reserved for touch-pad activities such as electronic-signature capture on an HTML page not otherwise requiring touch-pad support. The touch pad C31 and the display C41 may cooperate to create a touchscreen.

Figure 8:
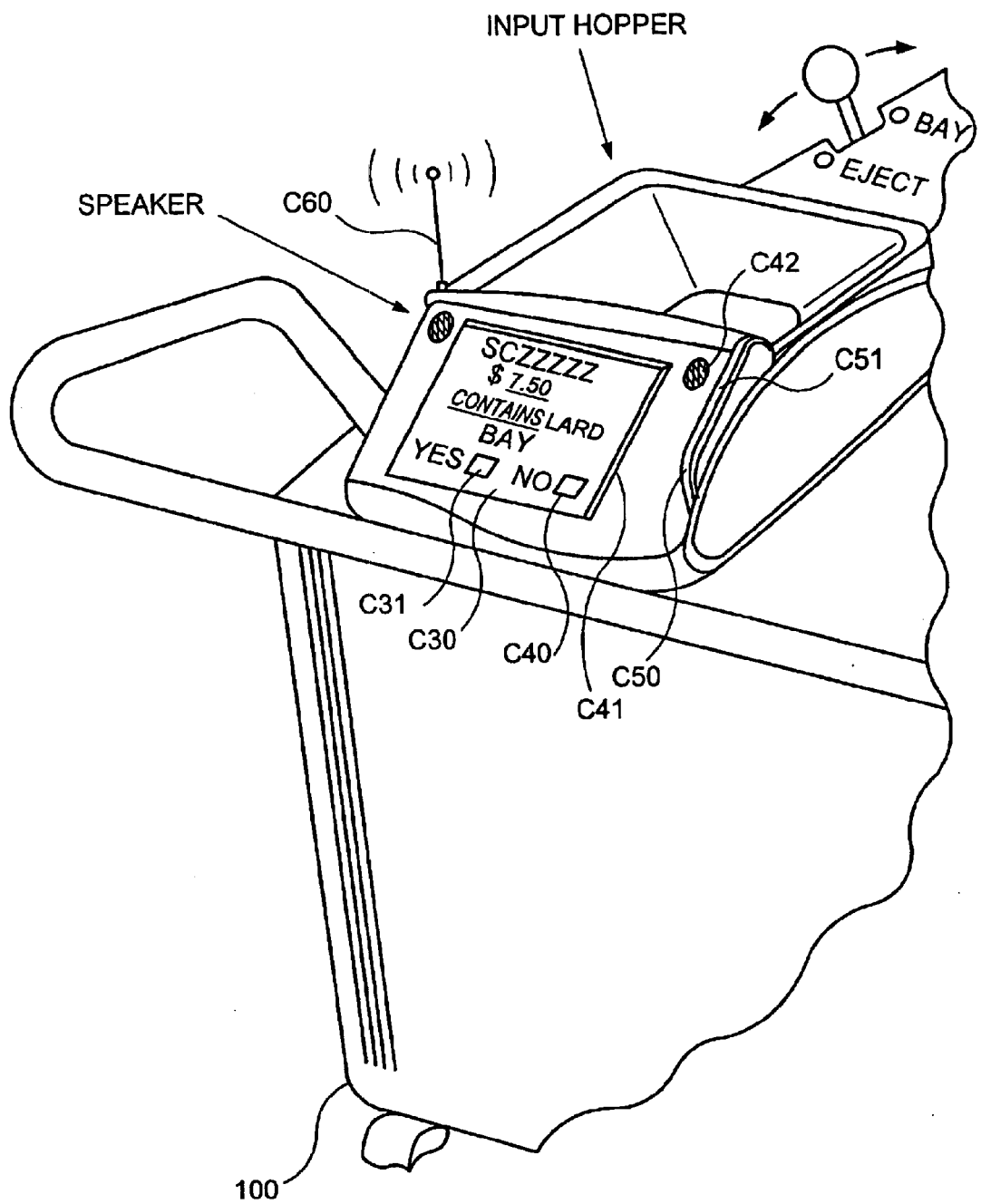
FIG. 8 illustrates an embodiment of the shopping computer C00.

FIG. 8 illustrates an embodiment of the shopping computer C00. Visible in FIG. 8 are the input, output, payment and communications subsystems C30, C40, CS0 and C60. More particularly, FIG. 8 shows the touch pad C31, the LCD display C41, the speakers of the sound system C42, the payment-subsystem magnetic-strip reader C51 and an antenna electrically coupled to the wireless communications port C66.

Figure 9:
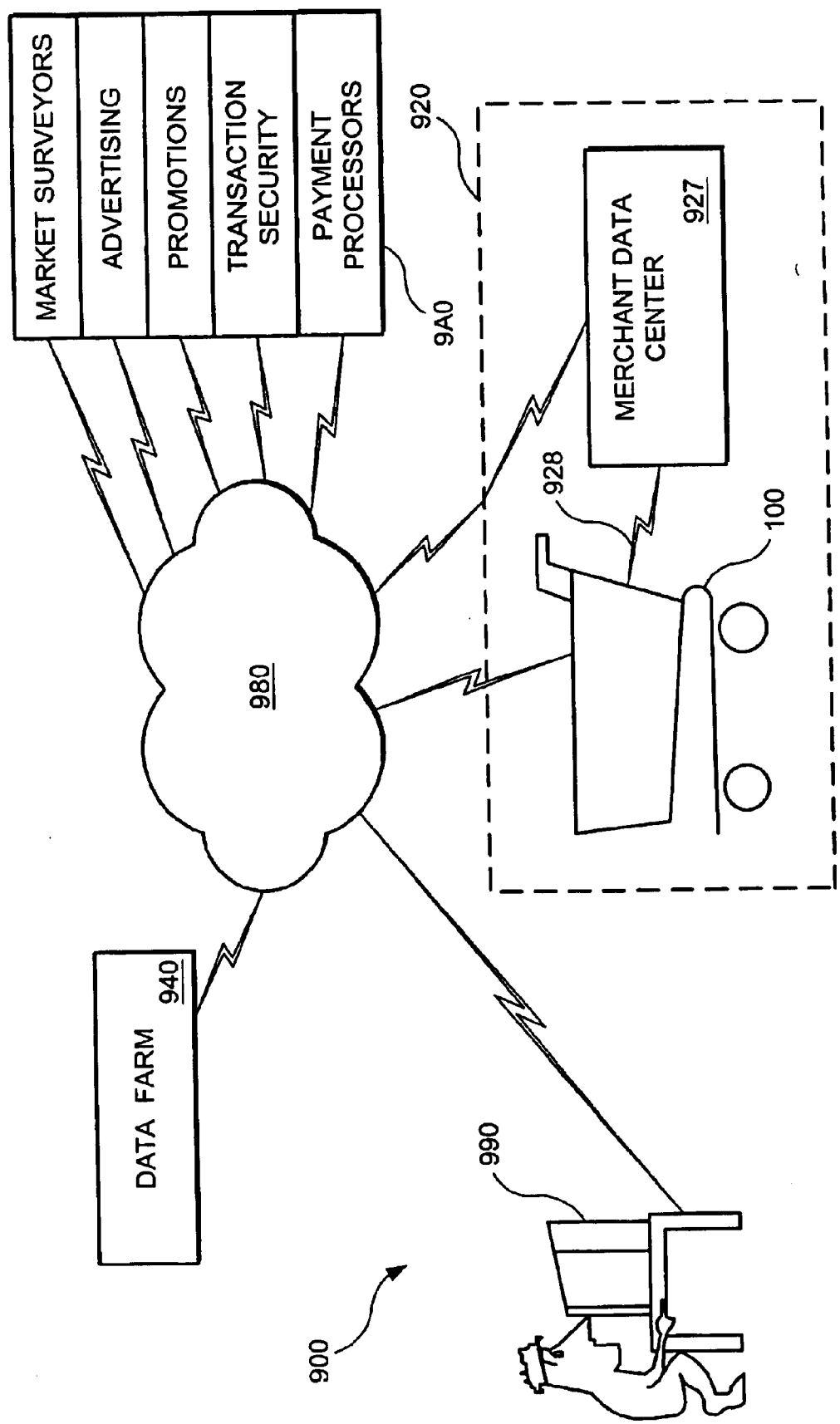
FIG. 9 illustrates a shopping system 900 incorporating one embodiment of the invention.
Figure 10:
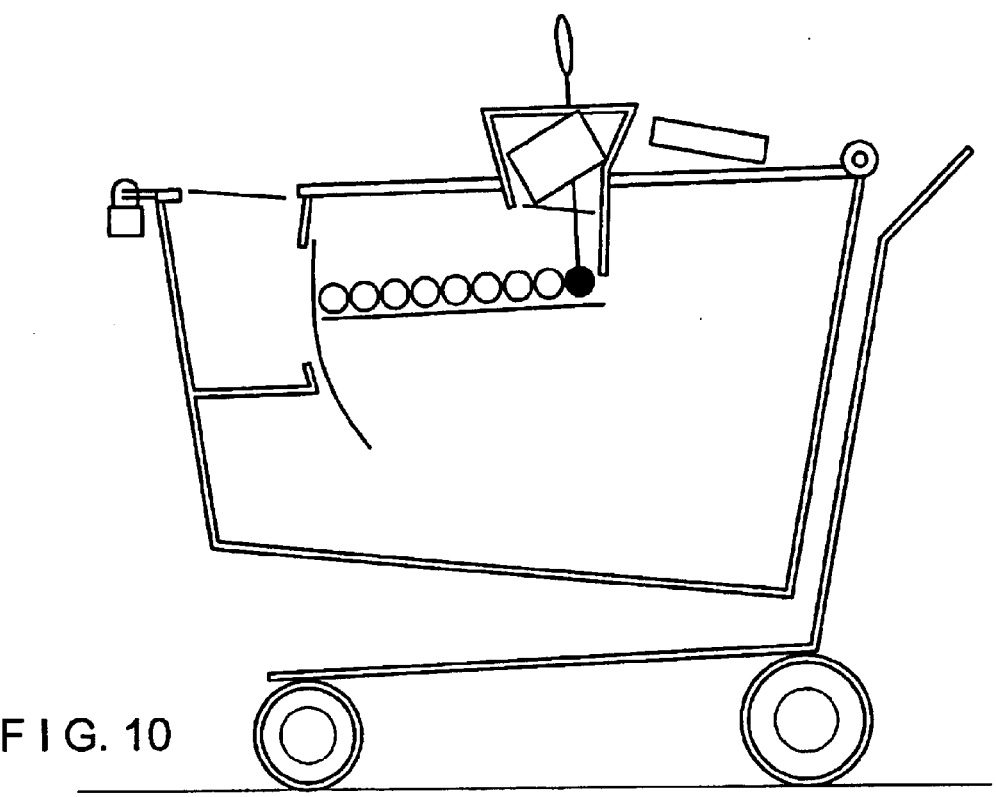
FIGS. 10 and 11 illustrate the movement of a goods selected by the consumer within a shopping cart, according to one embodiment of the invention.
Figure 11:
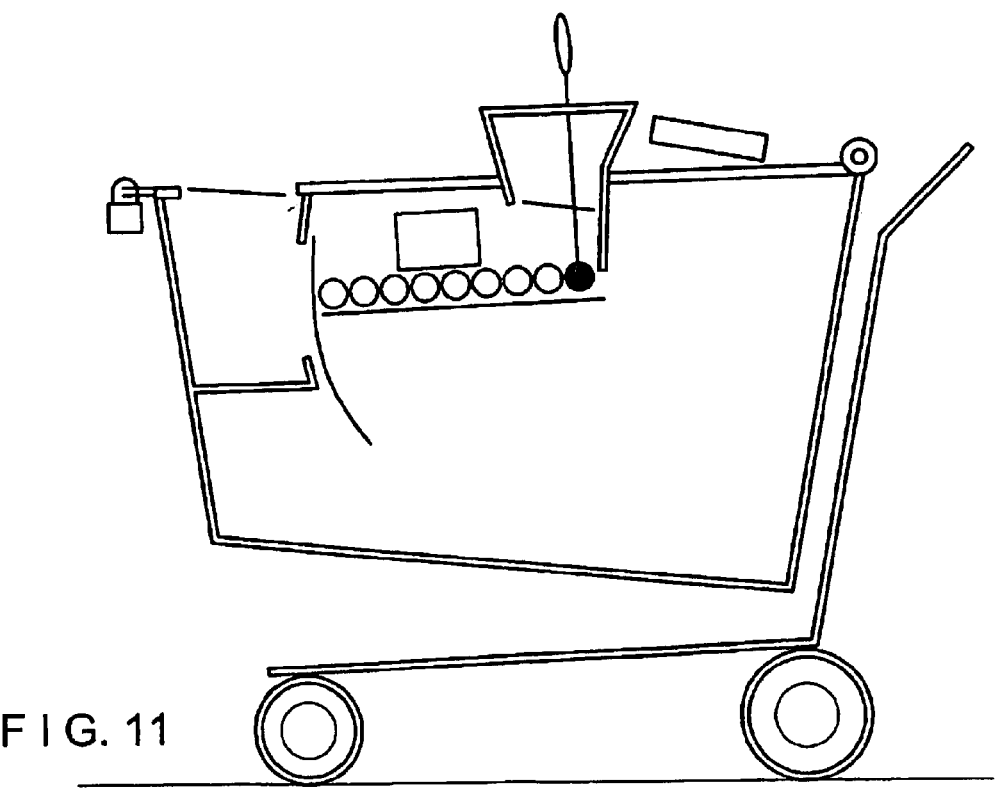

FIG. 9 illustrates a shopping system 900 incorporating one embodiment of the invention. In FIG. 9, the shopping system 900 includes one or more merchants 920, a central data farm 940, application service providers (ASPs) 9A0 and a personal computer 990. The system 900 also includes communications link 980. The link 980 communicatively couples the merchant 920, data farm 940, ASPs 9A0 and computer 990.

The link 980 may be an internet. In this case, each merchant 920, data farm 940 and ASP 9A0 connect as hosts to the internet 980. (Each of the merchant 920, the data farm 940, the ASP 9A0 and the personal computer 990 is viewed as a host on the internet 980 although its actual status depends on the directness of its connection to that internet 980, for example, through optional service providers not shown.)

A merchant 920 may include a merchant data center 927 and one or more shopping carts 100. A cart 100 and the merchant data center 927 communicate over a (typically wireless) communications link 928. The shopping cart 100 may be communicatively connected as a host on the internet 980, allowing communications with any other host on the internet 980.

An Illustrative Use

From the foregoing description, one of ordinary skill in the art will see various uses of the shopping cart 100. One such use is now described with reference to FIGS. 10, 11, 5 and 6.

A shopper approaches a merchant store equipped with a shopping cart 100. The shopper takes such a cart 100 before (or on) entering the store. The cart 100 typically will be locked by means of the lock 134 and its bin 1311 empty.

The shopper may program the shopping computer C00 to the shopper's individual preferences. For example, through a series of menus and choices, the shopper may instruct the shopping computer C00 to warn the shopper if the grams of fat per serving of a selected item is known to exceed a predetermined amount. Likewise, the shopping computer C00 may be programmed to warn of an excessive per-serving calorie count. The shopper may instruct the computer C00 to notify him if any selected item is known to contain an ingredient to which the shopper is allergic.

Having programmed the computer C00, the shopper proceeds to shop. Passing through the frozen-desserts section, the shopper decides to buy a pint of Hoagen Dazs® ice cream. He selects a pint and places it in the input-bin opening A00. As the pint moves through the input bin 13225, the one or more scanners C32 scan for the UPC or SKU on the pint. When the scanner C32 succeeds in identifying the goods in the input bin 13225, the input subsystem C30 communicates that identity to the application software C11231. The application software C1231 operates the wireless communications port to communicate that identity to the data center of the merchant.

The data center and the computer C00 cooperate to return information to the computer C00 such as product identity, price, grams per serving, calories per serving, servings per container, ingredients, nutritional value, recipes including or complementing the product, etc. The application software C1231 displays some or all of this information on the display C41.

In the meanwhile, the selected goods moves through the input bin 13225 into the chamber 13224.

The shopper may indicate his continuing desire to purchase the ice cream by moving the acceptance-system handle 13221 (from its NEUTRAL position) to its ACCEPT position. This activates the movable section of the chamber conveyor 132244 to defeat the integrity of the chamber 13224 and allow the ice cream to fall into the basket buck 131.

Where, however, the ice cream is too rich for the shopper's blood (metaphorically, in terms of fat grams per serving or calories per serving, or literally, in terms of cost), the shopper rejects the goods by moving the acceptance-system handle 13221 to its REJECT position. The movable section D00 of the chamber conveyor 132244 allows the ice cream to move along the first path for goods into the no-sale bin 13223. The shopper may remove the ice-cream goods from that no-sale bin 13223 and return the goods to the freezer.

With each goods accepted, the computer C00 may maintain a running total. When the shopper is done shopping, he may pay for the accepted goods by, say, invoking a payment menu on the touchscreen C31 and sliding his credit or debit card through the payment subsystem's magnetic-strip reader C51. The shopping computer C00 communicates with the merchant data center 927 which in turn may communicate with allies 9A0 or the data form 940 to verify the authenticity of the presented card and its ability to pay for the instant transaction.

Once payment for the goods has been accepted, the shopper may proceed to a post-checkout station. Here, an agent of the merchant unlocks the shopper's cart 100, swings the lid 132 away from the bucket 131 and extracts and packs the goods in the bucket bin 1311. (She may also return any items in the no-sale bin to their proper locations in the store.)

The shopper, the merchant agent or the shopping computer C00 itself (say, on a no-input timeout) may clear the shopper's preferences from the computer C00.

Indeed, the invention now being fully described, many changes and modifications that can be made thereto without departing from the spirit or scope of the appended claims will be apparent to one of ordinary skill in the art. For example, the shopping computer C00 may be fully or partially detachable from the cart 100 and portable. A hand-held PC whose expansion slot fits a corresponding slot on the cart 100 would illustrate this alternate embodiment. Such portability would enable further uses of the cart 100. For example, a user may input a shopping list into the portable section of the computer C00 while at home. In the store, the computer C00 could (efficiently) guide the shopper to the goods on the list and notify the user if he proceeds to pay for his selected goods but has not bought everything on the list.

Also, the information communicated to the shopper may be targeted. Where the product put in the input bin is a garment, the computer may display suggestions for completing a coordinated outfit including the product. Where the product is mechanical in nature, the computer may display a list of tools necessary to assemble, use or repair the product.

This specification incorporates by reference all publications and patent applications mentioned herein, to the same extent if the specification had specifically and individually incorporated by reference

What is claimed is:

1. A self-checkout shopping cart, comprising:
    a user-movable basket sized to receive user-selected barcoded items, said basket partitioned into at least a temporary input bin, a purchase bins and no-sale bin;
    a barcode scanner disposed at an entry region of said temporary input bin so as to scan each user-selected item before said item can enter into said input bin;
    a handle moveable by said user to enable said user to cause a user-selected barcode-scanned item in said temporary input bin to be conveyed from said temporary input bin into a user-selected one of said purchase bin and said no-sale bin;
    wherein only user-selected barcode-scanned items conveyed into said purchase bin will be purchased by said user; and
    means for outputting information as to each user-selected barcode scanned said item in said purchase bin.

2. The cart of claim 1, further including means for conveying items into said basket without damaging said items.

3. The cart of claim 1, wherein said means for outputting information communicates said information to a system separate from said cart.

4. The cart of claim 1, wherein said means for outputting information communicates said information wirelessly to a system separate from said cart.

5. The cart of claim 1, wherein said means for outputting information presents said information on a display attachable to said cart.

6. The cart of claim 1, further including means for transacting a sale of items in said purchase bin, said means for transacting coupled to said means for outputting information.

7. A self-checkout shopping cart, comprising:
    a user-movable basket sized to receive user-selected barcoded items, said basket partitioned into at least a temporary input bin, a purchase bin, and a no-sale bin;
    a barcode scanner disposed at an entry region of said temporary input bin so as to scan each user-selected item before said item can enter into said temporary input bin;
    means for conveying user-selected items scanned by said barcode scanner from said temporary input bin into a user-selected one of said purchase bin and said no-sale bin; and
    means for outputting information as to each scanned user-selected said item in said purchase bin.

8. The cart of claim 7, wherein said means for outputting information communicates said information to a system separate from said cart.

9. The cart of claim 7, wherein said means for outputting information communicates said information wirelessly to a system separate from said cart.

10. The cart of claim 7, wherein said means for outputting information presents said information on a display attachable to said cart.

11. The cart of claim 7, further including means for transacting a sale of items in said purchase bin, said means for transacting coupled to said means for outputting information.

12. The cart of claim 7, wherein said means for conveying conveys scanned said items into said basket without damaging said items.

13. A self-checkout shopping cart, comprising:

- a user-movable basket sized to receive user-selected barcoded items, said basket partitioned into at least a temporarily input bin, a purchase bin and a no-sale bin;
- a barcode scanner disposed at an entry region of said temporary input bin so as to scan each user-selected item before said item can enter into said temporary input bin;
- means for conveying user-selected items scanned by said barcode scanner from said temporary input bin into a user-selected one of said purchase bin and said no-sale bin;
- means for outputting information as to each user-selected barcode-scanned item in said purchase bin; and
- means, coupled to said means for outputting and attached to said cart, for purchasing user-selected barcode-scanned items that have been conveyed into said purchase bin.

14. The cart of claim 13, wherein said means for outputting information communicates said information to a system separate from said cart.

15. The cart of claim 13, wherein said means for outputting information communicates said information wirelessly to a system separate from said cart.

* * * * *

UNITED STATES PATENT AND TRADEMARK OFFICE
CERTIFICATE OF CORRECTION

| | |
|---|---|
| PATENT NO. | : 6,910,697 B2 |
| APPLICATION NO. | : 09/738491 |
| DATED | : June 28, 2005 |
| INVENTOR(S) | : Varatharajah et al. |

It is certified that error appears in the above-identified patent and that said Letters Patent is hereby corrected as shown below:

Column 10, lines 4-7 are corrected as follows:

"This specification incorporates by referenc all publications and patent application mentioned herein, to the same extent if the specification had specifically and individually incorporated by reference <u>each such individual publication or patent application</u>."

Column 10, lines 9-24

Claim 1 is corrected as follows:

1. A self-checkout shopping cart, comprising:

a user-movable basket sized to receive user-selected bar-coded items, said basket partitioned into at least a temporary input bin, a purchase bin[[s]]<u>,</u> and a no-sale bin;

a barcode scanner disposed at an entry region of said temporary input bin so as to scan each user-selected item before said item can enter into said <u>temporary</u> input bin;

a handle movable by said user to enable said user to cause a user-selected barcode-scanned item in said temporary input bin to be conveyed from said temporary input bin into a user-selected one of said purchase bin and said no-sale bin;

wherein only user-selected barcode-scanned items conveyed into said purchase bin will be purchased by said user; and means for outputting information as to each user-selected barcode scanned [[said]] item in said purchase bin.

UNITED STATES PATENT AND TRADEMARK OFFICE
CERTIFICATE OF CORRECTION

| | | |
|---|---|---|
| PATENT NO. | : 6,910,697 B2 | |
| APPLICATION NO. | : 09/738491 | |
| DATED | : June 28, 2005 | |
| INVENTOR(S) | : Varatharajah et al. | |

It is certified that error appears in the above-identified patent and that said Letters Patent is hereby corrected as shown below:

Column 10, lines 25-27

Claim 2 is corrected as follows:

2.   The cart of claim 1, further including means for conveying <u>said</u> items into said basket without damaging said items.

Column 11, lines 4-Column 12, lines 7

Claim 13 is corrected as follows:

13.   A self-checkout shopping cart, comprising:

a user-movable basket sized to receive user-selected bar-coded items, said basket partitioned into at least a temporarily input bin, a purchase bin, and a no sale bin;

a barcode scanner disposed at an entry region of said temporary input bin so as to scan each user-selected item before said item can enter into said temporary input bin;

UNITED STATES PATENT AND TRADEMARK OFFICE
CERTIFICATE OF CORRECTION

| | | |
|---|---|---|
| PATENT NO. | : 6,910,697 B2 | Page 3 of 3 |
| APPLICATION NO. | : 09/738491 | |
| DATED | : June 28, 2005 | |
| INVENTOR(S) | : Varatharajah et al. | |

It is certified that error appears in the above-identified patent and that said Letters Patent is hereby corrected as shown below:

Column 11, lines 4-Column 12, lines 7

Claim 13 is corrected as follows: (cond't)

means for conveying user-selected items scanned by said barcode scanner from said temporary input bin into a user-selected one of said purchase bin and said no-sale bin;

means for outputting information as to each user-selected barcode-scanned item in said purchase bin; and means, coupled to said means for outputting and attached to said cart, for purchasing uer-selected barcode-scanned items that have been conveyed into said purchase bin.

Signed and Sealed this

Seventeenth Day of October, 2006

JON W. DUDAS
*Director of the United States Patent and Trademark Office*